United States Patent
Nguyen et al.

(10) Patent No.: US 10,983,238 B2
(45) Date of Patent: Apr. 20, 2021

(54) WELLBORE SAND DETECTION USING PASSIVE ACOUSTIC ARRAY

(71) Applicant: Halliburton Energy Services, Inc., Houston, TX (US)

(72) Inventors: Nam Nguyen, Singapore (SG); Yi Yang Ang, Singapore (SG); Srinivasan Jagannathan, Houston, TX (US); Avinash Taware, The Woodlands, TX (US); Darren Philip Walters, Tomball, TX (US); Freeman Hill, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/546,982

(22) PCT Filed: Sep. 26, 2016

(86) PCT No.: PCT/US2016/053705
§ 371 (c)(1),
(2) Date: Jul. 27, 2017

(87) PCT Pub. No.: WO2018/057029
PCT Pub. Date: Mar. 29, 2018

(65) Prior Publication Data
US 2019/0203585 A1  Jul. 4, 2019

(51) Int. Cl.
*G01V 1/50* (2006.01)
*E21B 47/107* (2012.01)
(Continued)

(52) U.S. Cl.
CPC .............. *G01V 1/50* (2013.01); *E21B 47/107* (2020.05); *G01V 1/306* (2013.01); *G01V 1/42* (2013.01);
(Continued)

(58) Field of Classification Search
CPC ........ E21B 47/101; G01V 1/42; G01V 1/306; G01V 1/50; G01V 2210/123; G01V 2210/1234; G01V 2210/62; G01V 2210/43
See application file for complete search history.

(56) References Cited

U.S. PATENT DOCUMENTS 5,373,486 A * 12/1994 Dowla ................... G01V 1/003
181/101
7,894,300 B2  2/2011 Hawthorn et al.
(Continued)

FOREIGN PATENT DOCUMENTS

CA      2663497 C    4/2014
WO   WO 2010/094809 A1   8/2010
(Continued)

OTHER PUBLICATIONS

Daud et al., "Successful Application of Ultrasound Technology To Detect Sand Producing Intervals In The Wellbore," MS Publisher International Petroleum Technology Conference Source International Petroleum Technology Conference, Nov. 15-17, Bangkok, Thailand (Year: 2011).*

(Continued)

*Primary Examiner* — Ian J Lobo
(74) *Attorney, Agent, or Firm* — Haynes and Boone, LLP

(57) ABSTRACT

A passive array of acoustic sensors capture acoustic signals produced by sand movement. The array tool is deployed downhole where it passively listens for acoustic energy generated by sand movement in the well. Once acoustic signals are acquired, model-based frameworks are used to extract single and multiple sensor features from the acoustic signals. The extracted features are used as signatures to detect or classify the production of sand.

16 Claims, 6 Drawing Sheets

(51) Int. Cl.
*G01V 1/30* (2006.01)
*G01V 1/42* (2006.01)

(52) U.S. Cl.
CPC .............. *G01V 2210/123* (2013.01); *G01V 2210/1234* (2013.01); *G01V 2210/43* (2013.01); *G01V 2210/62* (2013.01)

(56) References Cited

U.S. PATENT DOCUMENTS

| | | |
|---|---|---|
| 8,789,587 B2 | 7/2014 | Tubel et al. |
| 2007/0047867 A1 | 3/2007 | Goldner |
| 2007/0175280 A1* | 8/2007 | Johansen ............... G01N 15/06 73/599 |
| 2010/0057378 A1 | 3/2010 | Chen et al. |
| 2012/0096922 A1 | 4/2012 | Ellson |
| 2015/0377667 A1 | 12/2015 | Ahmad et al. |
| 2016/0069743 A1* | 3/2016 | McQuilkin ........... G01J 3/2803 356/416 |

FOREIGN PATENT DOCUMENTS

| | | |
|---|---|---|
| WO | WO 2015/004487 A2 | 1/2015 |
| WO | WO 2015/013394 A1 | 1/2015 |
| WO | WO 2015/035060 A1 | 3/2015 |
| WO | WO 2015/108668 A1 | 7/2015 |
| WO | WO 2016/010553 A1 | 1/2016 |
| WO | WO 2016/115012 A1 | 7/2016 |
| WO | WO 2016/115030 A1 | 7/2016 |
| WO | WO 2017/062015 A1 | 4/2017 |

OTHER PUBLICATIONS

International Search Report and the Written Opinion of the International Search Authority, or the Declaration, dated Jun. 26, 2017, PCT/US2016/053705, 16 pages, ISA/KR.
Supplementary Search Report issued for European Patent Application No. 16916995, dated Jan. 27, 2020, 7 pages.

* cited by examiner

WELLBORE SAND DETECTION USING PASSIVE ACOUSTIC ARRAY

PRIORITY

The present application is a U.S. National Stage patent application of International Patent Application No. PCT/US2016/053705, filed on Sep. 26, 2016, the benefit of which is claimed and the disclosure of which is incorporated herein by reference in its entirety.

FIELD OF THE DISCLOSURE

The present disclosure relates generally to downhole sand detection and, more specifically, to a passive acoustic array system and method to detect sand production in-situ using model-based and learning-based frameworks.

BACKGROUND

Many reservoirs comprised of relatively young sediments are so poorly consolidated that sand will be produced along with the reservoir fluids. Sand production leads to numerous production problems, including erosion of downhole tubulars; erosion of valves, fittings, and surface flow lines; the wellbore filling up with sand; collapsed casing because of the lack of formation support; and clogging of surface processing equipment. Even if sand production can be tolerated, disposal of the produced sand is a problem, particularly at offshore fields. Therefore, early detection of sand production is of upmost importance to reduce the risks of infrastructure damages and threats of operation shutdown.

DESCRIPTION OF ILLUSTRATIVE EMBODIMENTS

Illustrative embodiments and related methods of the present disclosure are described below as they might be employed in systems and method to detect sand production in-situ using a passive acoustic array. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of this disclosure will become apparent from consideration of the following description and drawings.

As described herein, illustrative embodiments and methods of the present disclosure provide sand detection and classification using a passive acoustic array tool. Using a passive acoustic array tool, the sand may be detected downhole at the location where it enters the well (i.e., in-situ). Unlike an active acoustic array which produces an acoustic output signal and waits to detect an echo, the passive acoustic array tools described herein passively listen for acoustic signals produced by the sand itself. As a result, the model-based detection/classification of the present disclosure is more robust than conventional approaches, while also being simpler in design.

In a generalized embodiment and related method of the present disclosure, a passive array of acoustic sensors is designed to capture acoustic signals produced by sand movement. The passive array tool is then deployed downhole where it passively listens for acoustic signals generated by sand production in the well. Once acoustic signals are sensed, model-based frameworks are used to extract single and multiple sensor features from the acoustic signals. The extracted features are then used as signatures to detect or classify the production of sand. The classifications may include parameters such as, for example, sand density, flow rate, or particle size.

The illustrative detection and classification models may be derived analytically or empirically. Three illustrative frameworks are described herein to detect the production of sand and determine its related parameters. The first illustrative framework uses a model-based approach, while the second illustrative framework one follows the learning-based approach. The third illustrative framework is the extension of the learning-based approach where the model can be improved by retraining with verified archived data from the wellbore in which the sand is being produced or from other wellbores.

Figure 1:
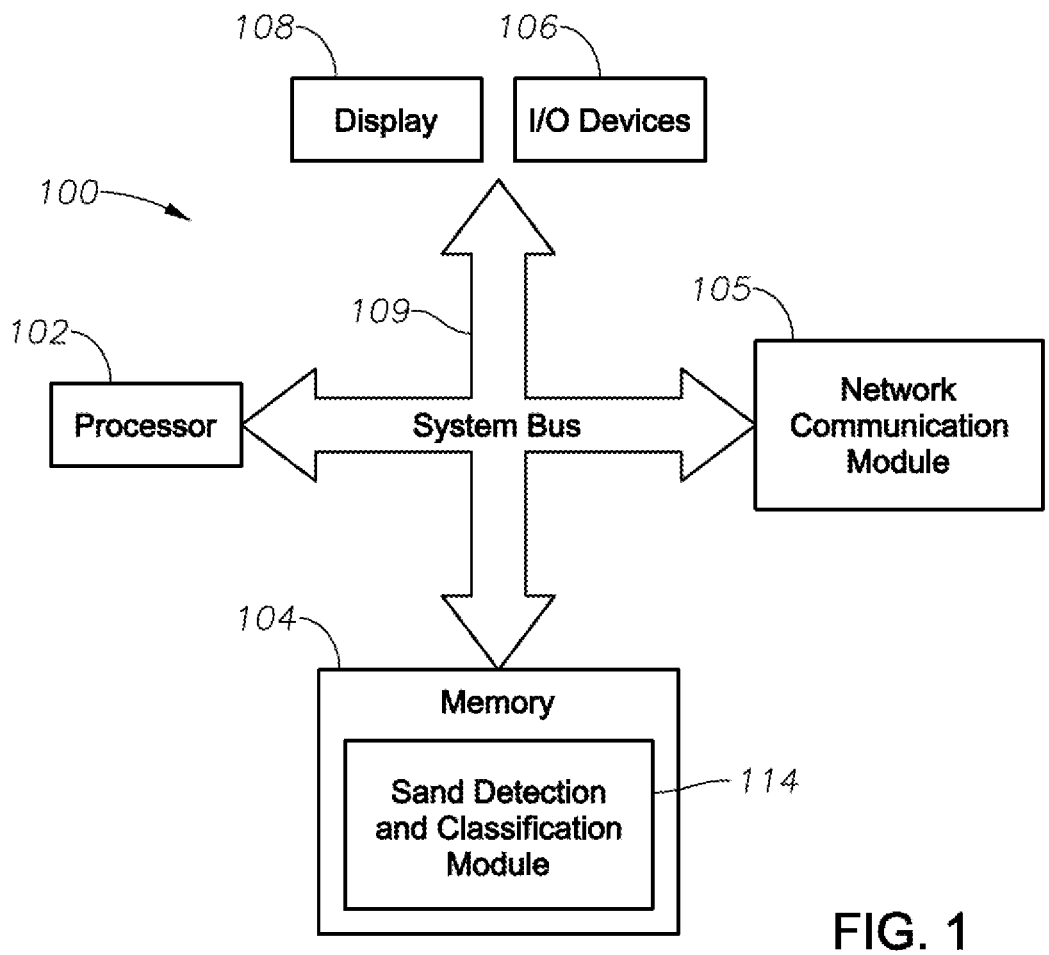
FIG. 1 shows a block diagram of a sand detection and classification system 100 according to certain illustrative embodiments of the present disclosure.

FIG. 1 shows a block diagram of a sand detection and classification system 100 according to certain illustrative embodiments of the present disclosure. Sand detection and classification system 100 includes at least one processor 102 (i.e., processing circuitry), a non-transitory, computer-readable memory 104, transceiver/network communication module 105, optional I/O devices 106, and an optional display 108 (e.g., user interface), all interconnected via a system bus 109. Software instructions executable by the processor 102 for implementing the functions of the illustrative methods described herein may be stored in memory 104.

Although not explicitly shown in FIG. 1, it will be recognized that sand detection and classification system 100 may be connected to one or more public and/or private networks via one or more appropriate network connections. It will also be recognized that the software instructions to perform the functions of the present disclosure may also be loaded into memory 104 from a CD-ROM or other appropriate storage media via wired or wireless methods.

Moreover, those ordinarily skilled in the art will appreciate that embodiments of this disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. This disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Still referring to FIG. 1, in certain illustrative embodiments, sand detection and classification system 100 includes sand detection and classification module 114. Sand detection and classification module 114 uses a variety of model-based frameworks to detect the production of sand and determine its related parameters. As will be discussed in more detail below, a first illustrative framework uses a model-based approach, while the second one follows a learning-based approach (yet still referred to as a model-based approached). The third illustrate framework is an extension of the learning-based approach where the model is further improved by retraining using verified archived parameters.

Figure 2:
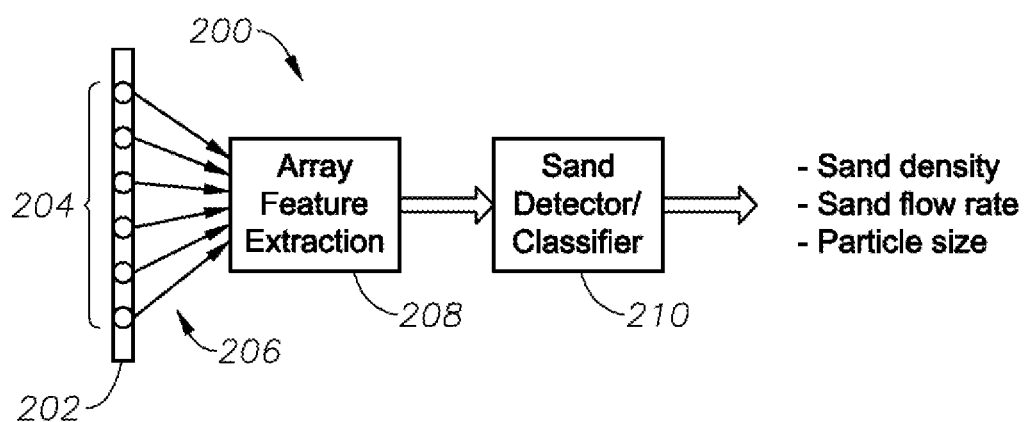
FIG. 2 is a diagrammatic illustration of a model-based framework to detect sand production downhole, according to certain illustrative methods of the present disclosure.

FIG. 2 is a diagrammatic illustration of a model-based framework to detect sand production downhole, according to certain illustrative methods of the present disclosure. Here, model-based framework 200 depicts a framework in which a sand detector/classifier applies a pre-derived model to features extracted from acoustic signal to detect the presence of sand, as well as to calculate the sand parameters, such as, for example, sand density, flow rate and particle size. The process of calculating/determining the sand parameters is also referred to herein as "classification."

In model-based framework 200, a leak detection tool 202 (e.g., passive acoustic array tool) having a plurality of acoustic sensors 204 thereon is deployed into a wellbore. Sand detection and classification system 100 may be embodied within leak-detection tool 202, some other downhole tool, or may be located uphole at the surface. In alternative embodiments, one or more processing steps of the illustrative methods may be performed downhole, while others are performed uphole. Once leak detection tool 202 is positioned as desired downhole, sand may begin to leak into the wellbore, thereby generating acoustic energy which is sensed by leak detection tool sensors 204. Leak detection tool 202 then generates corresponding acoustic array signals 206 which are then fed into model-based framework 200.

At block 208, sand detection and classification system 100, applying model-based framework 200, then extracts one or more features from acoustic signals 206. During the feature extraction stage of block 208, detection and classification system 100 uses acoustic signals from one or more sensors 202 to produce features, such as, for example, spatial information. In certain illustrative methods, the extracted features may include single-sensor features, such as, for example, spectral power density or time-frequency components. In alternative methods, however, the extracted features may include multiple-sensor features, such as, for example, covariances matrixes, principal components (eigenvalues), or phase and magnitude patterns. The use of multiple sensors reduces false alarm detection errors and improves the accuracy of the sand detection and/or classification. In yet other embodiments, sensors 202 may each be used to extract the same feature or different features.

Once the features are extracted at block 208, sand detector/classifier 210 (e.g., embodied as sand detection and classification module 114) then converts the features into an output indicating the presence of sand or a sand classification (e.g., sand density, flow rate, particle size, etc.). Sand detector/classifier 210 performs the conversion using modeling techniques, such as, for example, a sand detector/classifier to measure energy levels of the spectral power density at a certain frequency ranges to determine the presence of sand . In addition to calculating a specific parameter, sand detector/classifier may also determine a range of the parameter, such as, for example, a high or low density, flow rate or particle size (large or small).

As mentioned above, the eigenvalues of covariance matrixes are one illustrative extracted feature used to detect the presence of sand. The covariance matrix is formed from acoustic waveforms in all array channels of leak detection tool 202. The covariance matrix captures the correlation between different channels. Thus, the eigenvalues of the covariance matrix are a good indicator of the correlation level. Also, in other illustrative methods, when analyzing the covariance matrix in the frequency domain, the eigenvalues can be formed into an equivalent spectral power density for array signals.

Figure 3:
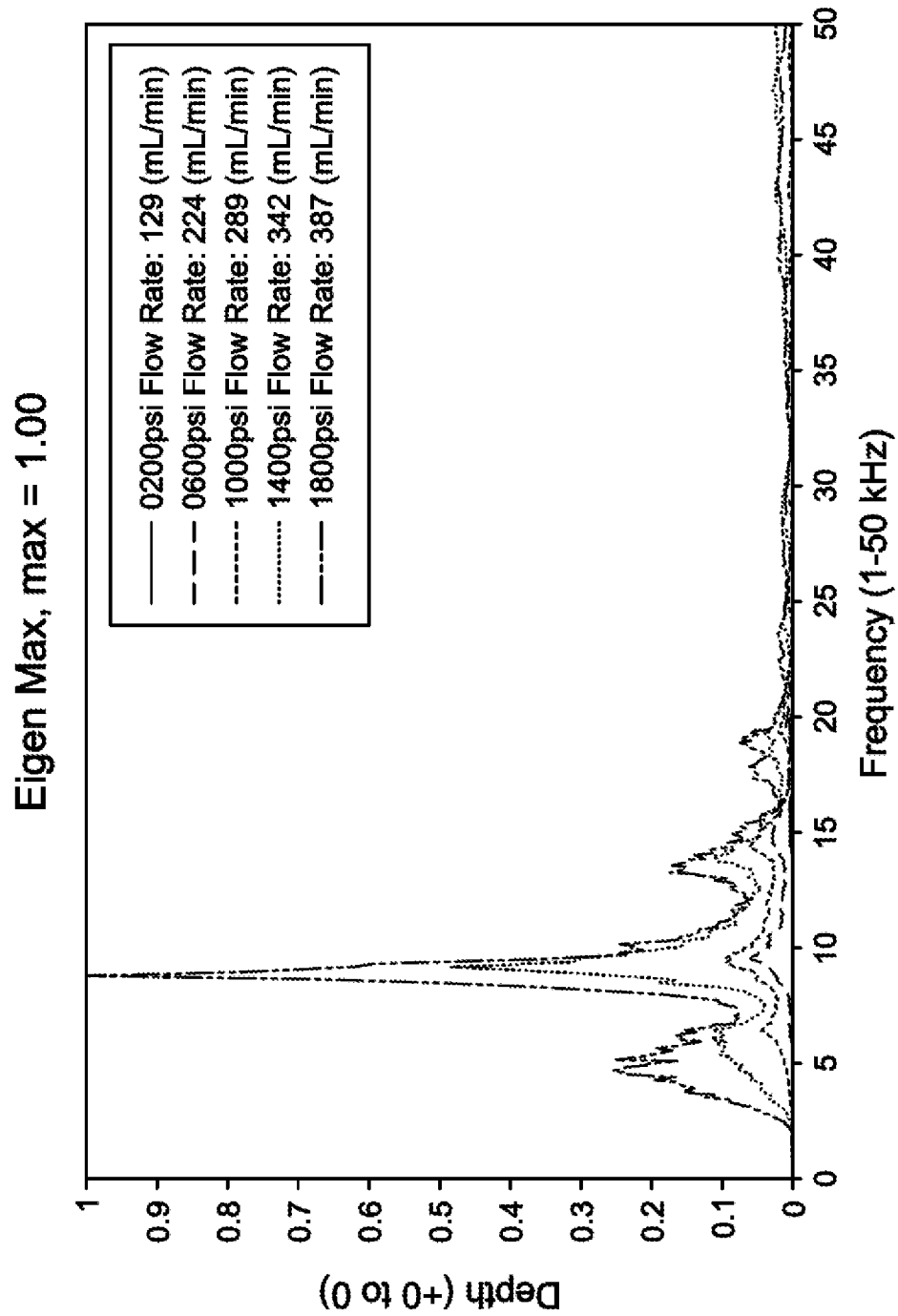
FIG. 3 is a graph showing a spectra of maximum eigenvalues for different downhole pressures, according to certain illustrative methods of the present disclosure.

FIG. 3 is a graph showing a spectra of maximum eigenvalues for different downhole pressures, according to certain illustrative methods of the present disclosure. FIG. 3 shows the trend of a maximum eigenvalue spectrum in an experiment where a leak detection tool having an acoustic array of 7 hydrophones (each are 4 inch apart) is used to measure a flow of jet water through a casing wall impacting directly on the array. As can be seen, the spectrum of maximum eigenvalues captures very well the change in water pressure. In this case, an model may designed to use this extracted information (i.e., feature) to infer the flow rate. Similarly, if the presence of sand in a flow will alter the frequency components of the eigenvalue spectrum, a model is built to detect the presence of sand. This model is illustrated as, and embodied in, sand detector/classifier 210 in FIG. 2.

In yet other illustrative methods, the extracted feature may be a ratio of eigenvalues of the acoustic signals. For example, the ratio between the largest and the second largest eigenvalues can be computed across different frequencies. The resulting spectrum-like profile may then be used as the feature to detect the sand or classify flow rates.

As mentioned above, the second illustrative model-based framework employs a learning-based approach. In the model-based approach of FIG. 2, model-based framework 200 is formed through analysis and observation of the relationship between the classification parameters and the extracted features. This approach sometimes requires understanding of the underlying phenomenon. In an alternate method, however, sand detection and classification system 100 employs machine learning techniques to generate the model directly using training data.

Figure 4:
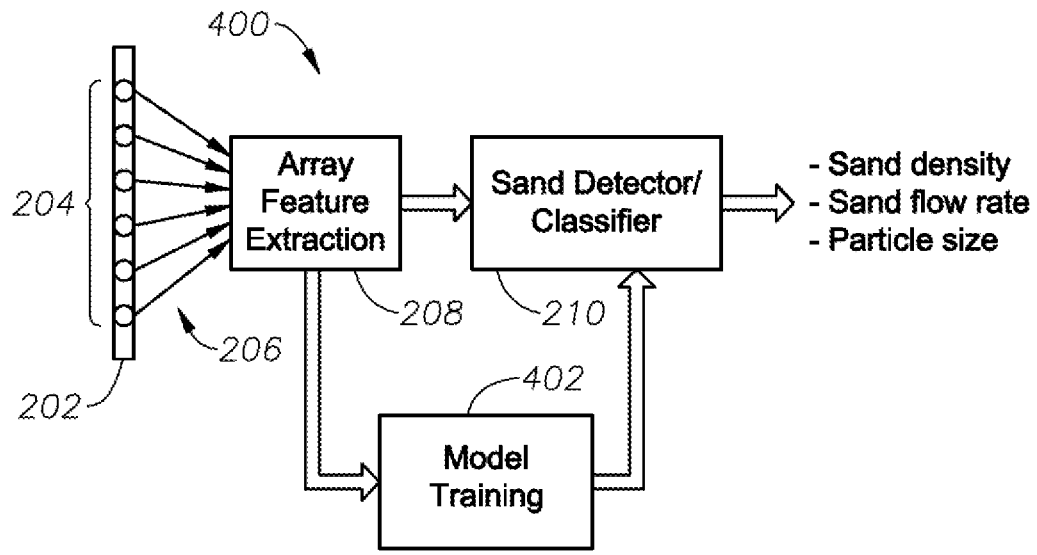
FIG. 4 is a diagrammatic illustration of a learning-based framework to detect sand production downhole, according to certain illustrative methods of the present disclosure.

FIG. 4 is a diagrammatic illustration of a model-based learning framework to detect sand production downhole, according to certain illustrative methods of the present disclosure. Model-based learning framework 400 is similar in operation to model-based framework 200 of FIG. 2, thus like elements refer to like elements. However, in model-based learning framework 400, model training is employed at block 402. Here, sand detection and classification system 100 applies a machine learning technique to build the model based on the extracted features from training data. For example, the machine learning technique may be applied to determine which features to extract from the acoustic signals. Examples of machine learning techniques may include, for example, learning algorithms that select which portion of a maximum eigenvalue spectrum is best used to detect sand. This spectrum range can be readjusted for different well condition based on the training data. Such learning techniques may be, for example, artificial neural network, decision tree, or association rule learning-based techniques.

In certain illustrative methods, during the learning phase of model-based learning framework 300, the initial training datasets may come, for example, from controlled experiments (instead of extracted features from acoustic signals 206) where classification parameters are accurately measured. In one example, the controlled experiments involve extracting features from acoustic signals where the classification parameters (e.g., sand densities, flow rates or particle sizes) are already known. Through an analysis of the relationship between the features and parameters, the system determines which features most accurately estimate the parameters. Those identified features are then used by the resulting model to detect the presence of sand and/or determine the classification parameters. Depending on complexity constraints and performance requirements, the machine learning may be designed as, for example, a linear regression or a multi-hidden-layered neural network. Once model-based learning framework 400 has been trained, the resulting model is then used by sand detector/classifier 210 to detect and classify the sand as described in FIG. 2. In certain other illustrative methods, the training data used in block 402 may be updated periodically to ensure the model being applied by sand detector/classifier 210 is performing optimally.

Figure 5:
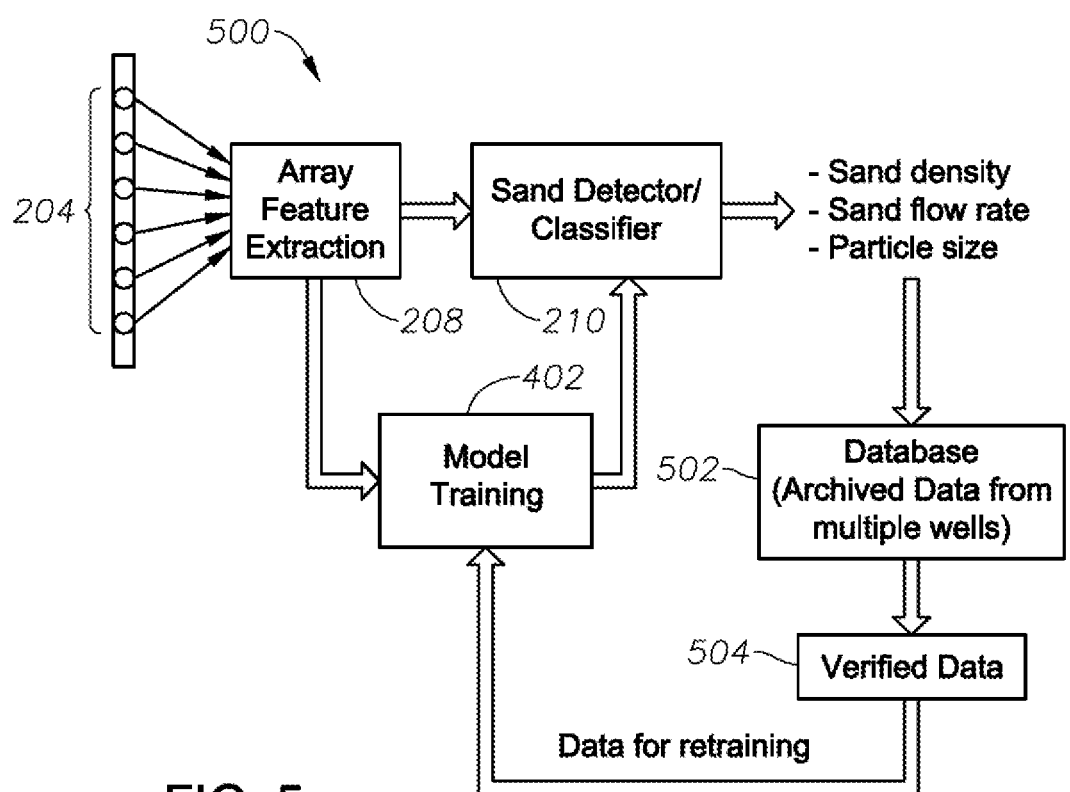
FIG. 5 is a diagrammatic illustration of a learning-based re-training framework to detect sand production downhole, according to certain illustrative methods of the present disclosure.

FIG. 5 is a diagrammatic illustration of a model-based re-training framework to detect sand production downhole, according to certain illustrative methods of the present disclosure. Model-based learning framework 500 is similar in operation to model-based framework 400 of FIG. 4, thus like elements refer to like elements. However, model-based re-training framework 500 is an extension of learning-based framework 400. In model-based re-training framework 500, the training data may be supplied from archived field data where classification parameters have been verified and confirmed. While sand detection requires early and timely results, there are a variety of ways in which to verify the parameters later. For example, in certain illustrative embodiments, a surface unit can be used to detect the presence and amount of sand in production flow, thus verifying the output (e.g., sand presence, flow rate, etc.) of sand detector/classifier 210. Thereafter, the verified and confirmed results can be reused to train and improve the learning model.

With reference to FIG. 5, in one illustrative method, model-based re-training framework 500 may be initially trained as described above in FIG. 4. After the initial training, a model is generated accordingly and used by sand detector/classifier 210 to detect the presence and/or classification parameters of the sand, as discussed herein. When, for example, sand detection and classification system 100 (using sand detector/classifier 210) determines sand is present at a certain flow rate, verification data may be retrieved from a database and analyzed at block 502. The verification data may be sourced from one or more local wells. For example, verification data from other wells may have also reflected the presence of the same sand, at the same flow rate or particle size. In such cases, sand detection and classification system 100 would determine the classification parameters output by sand detector/classifier 210 are accurate, and output those classification parameters as verified data at block 504. That verified data is then used to re-train and/or improve the model at block 402 to, again, determine those features most useful to extract from the signals. In certain illustrative methods, the training/re-training can occur iteratively until some error threshold is met. Once re-trained, sand detector/classifier 210 then applies the re-trained model to perform further sand detection and/or classification.

Figure 6:
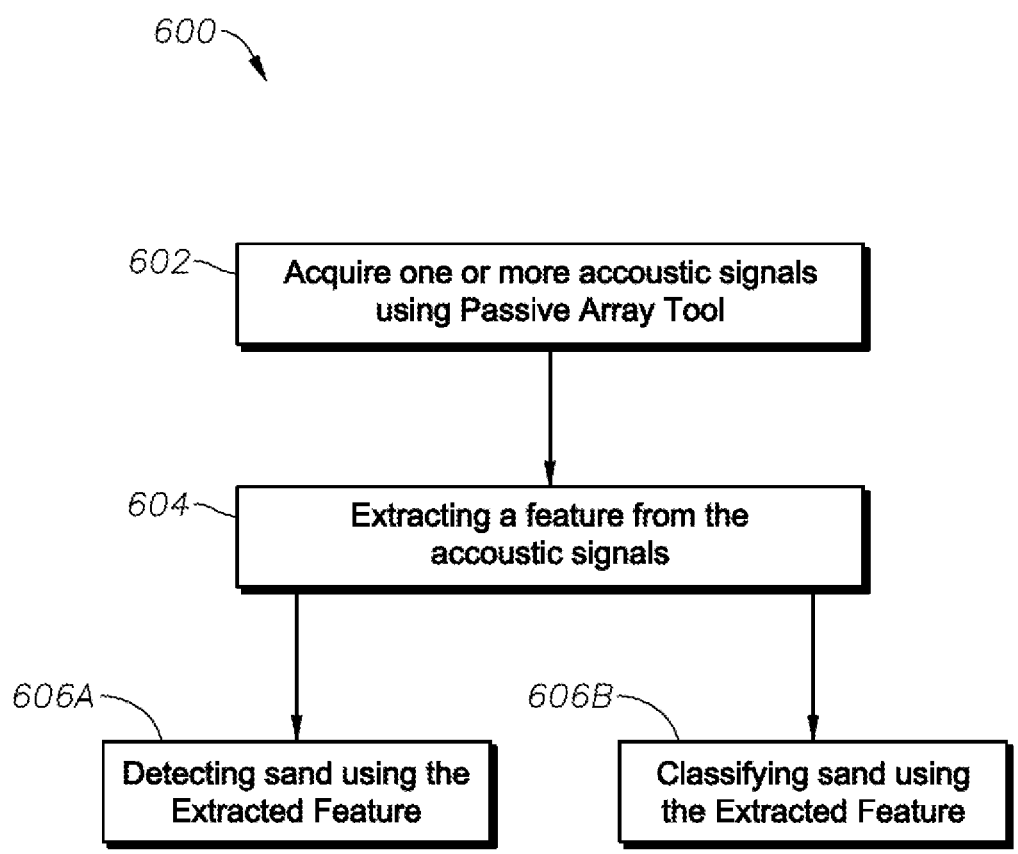
FIG. 6 is a generalized flow chart of a method 600 for detecting sand in a wellbore, according to certain illustrative methods of the present disclosure.

In view of the foregoing, FIG. 6 is a generalized flow chart of a method 600 for detecting sand in a wellbore, according to certain illustrative methods of the present disclosure. During a downhole operation, a passive acoustic array tool is deployed downhole to detect the presence of sand in-situ. At block 602, sand detection and classification system 100 acquires one or more of the acoustic signals using the passive array tool. At some point, the movement of sand in the wellbore adjacent the tool produces acoustic energy which is sensed by the tool, whereby acoustic signals are generated. At block 604, through the use of the illustrative models described herein, system 100 extracts one or more features from the acoustic signals. The features may be, for example, eigenvalues, time-frequency components, etc. At block 606A, the extracted features are used to detect the present of sand in the wellbore. Alternatively, at block 606B, the extracted features may be used to classify parameters of the sand (e.g., flow rate, density, etc.). Hereafter, if necessary, a well intervention operation may be performing to address the problems faced by sand production in the wellbore.

The passive acoustic array tools described herein are used to detect and determine the locations of sand leaks inside a wellbore. The array of acoustic sensors may take a variety of forms, such as, for example, an array of hydrophones. Such acoustic sensors can be in tools, systems, and methods to detect one or more underground sand acoustic sources and to localize them in depth and radial distance from a wellbore. In an example, an array of at least three acoustic sensors may be disposed in the wellbore can be used in conjunction with array signal processing. The term "depth" generally refers to a coordinate along the direction of a borehole, regardless whether the borehole extends vertically into the formation or is tilted with respect to the vertical direction, unless otherwise indicated. The term "radial distance" refers to a direction perpendicular to and away from the longitudinal wellbore axis. Acoustic-source detection and localization may be employed, in particular, to find underground sand flows, for example, resulting from leaks in well barriers, from which the acoustic signals emanate.

Array signal processing generally refers to techniques for estimating or calculating parameters of one or more signal sources, such as the source locations and emitted waveforms, by fusing data collected by an array of sensors with known geometric relations either substantially simultaneously or, more generally, with known temporal relations between the different sensor signals. "Substantially simultaneously" herein indicates that the time intervals over which signals are collected overlap significantly, for example, by at least 90% between the different sensors. The collected overlap can be at least 99% between the different sensors. Array-signal-processing techniques can include various spatial filtering methods, such as but not limited to Capon beamforming, multiple signal classification ("MUSIC"), and various parametric methods, as well as time-delay estimation.

Figure 7:
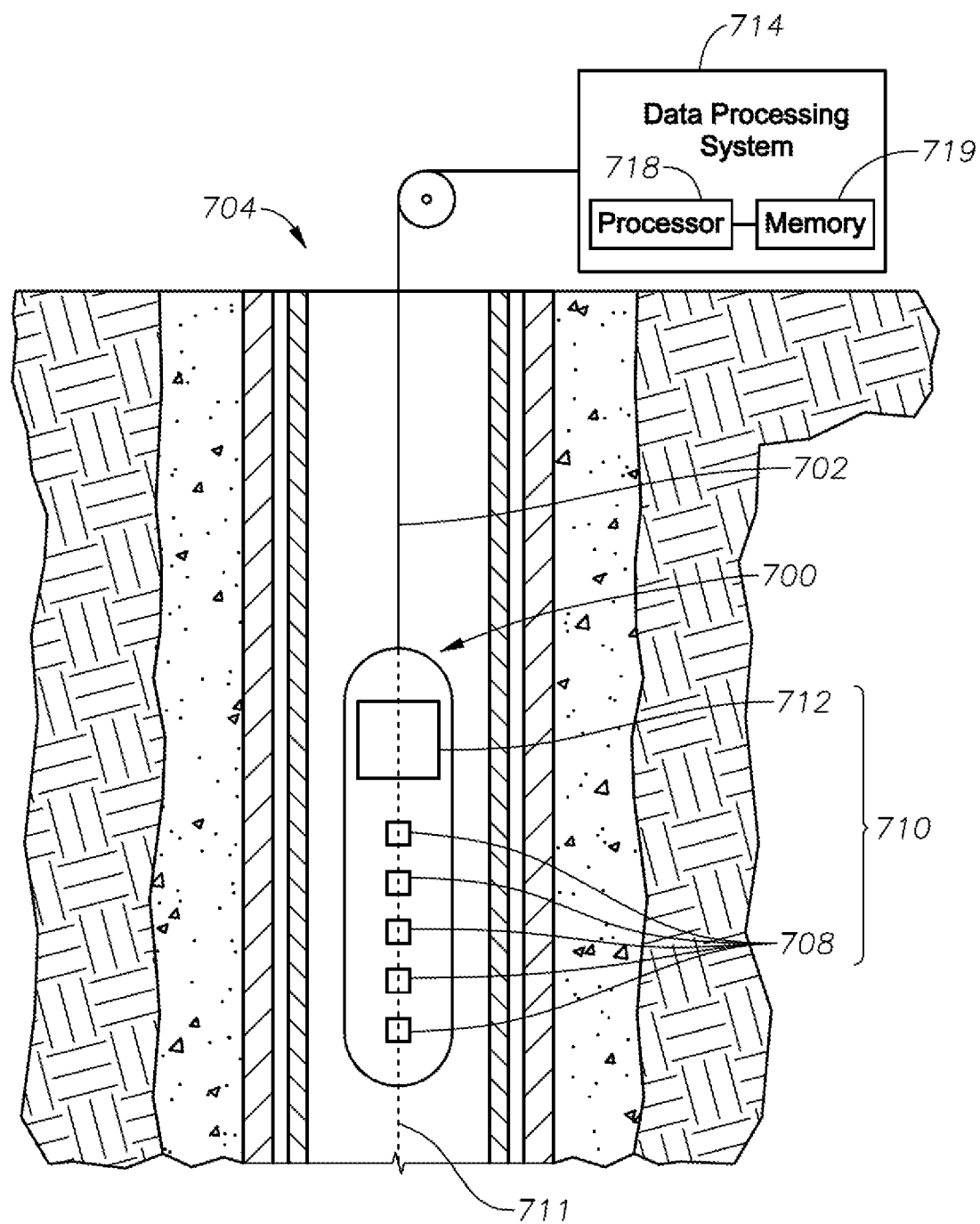
FIG. 7 is a schematic diagram of an embodiment of an illustrative wireline well-logging application.

As described herein, the passive acoustic array tools used in the detection and classification of underground sand-caused acoustic sources, and, thus, underground flows, can be deployed on a wireline, logging-while-drilling ("LWD") and measuring-while-drilling ("MWD") logging assembly, for example. FIG. 7 is a schematic diagram of an embodiment of an example wireline well-logging system. The system includes a sonde tool 700 (e.g., passive acoustic array tool) suspended from wireline 702 inside a cased wellbore 704. Tool 700 can be used inside a production tubing 706 through which hydrocarbons are pumped out of wellbore 704. Tool 700 can include, for example, at least three acoustic sensors 708 (e.g., hydrophones), which may be arranged in a linear array 710 along a longitudinal axis 711 of tool 700 and, thus, of wellbore 704.

Further, tool 700 may include suitable control and processing circuitry 712 (e.g., sand detection and classification system 100), which may, in turn, be in communication (e.g., via a wired connection or a telemetry system) with a surface data-processing system 714. A data-processing facility, providing computational functionality for processing and fusing the acoustic signals received by the individual sensors 708 and detecting and classifying sand flows based thereon, may be implemented by either one of control and processing circuitry 712 or data-processing system 714, or by both in combination. For example, in some embodiments, control and processing circuitry 712 pre-processes the individual sensor signals (e.g., through signal conditioning, filtering, and/or noise cancellation) and transmits them to surface data-processing system 714, where data is analyzed, and any flow-induced acoustic sources are detected and localized based thereon.

Each of the control and processing circuitry 712 and surface data-processing system 714 may generally be implemented in hardware or a combination of hardware and software such as with a suitably programmed processor 718 and associated memory 719. In various embodiments, the processed acoustic signals can be evaluated in conjunction with measurements from other sensors, for example, temperature and surface well-pressure measurements, to evaluate flow conditions and overall well integrity.

Alternative sensor configurations may be employed to support acoustic-source detection in a wireline logging operation. For example, in some embodiments, a distributed fiber optic cable is used in place of acoustic point sensors. The fiber optic cable can be permanently installed in the wellbore, e.g., clamped behind the casing or embedded in the cemented annulus. A channel, corresponding to a segment of the fiber-optic cable, can be scanned optically to detect surrounding acoustic signals. In this configuration, different channels at different depths correspond to different acoustic sensors.

Using tool 700, the acoustic sensor array can search, at a given depth of logging, a predefined space, for example, acoustic signals produced by sand movement. This search can be repeated as the array moves to another depth of logging. Thus, within one pass of wireline logging, a region spanning the entire length of the well can be searched for sand flow-induced acoustic sources. Once acoustic energy is located, the system may determine the presence of sand or classify the sand as described herein.

In some embodiments, the acoustic sensor array is operated in a fast logging speed to detect flows initially with coarse spatial resolution. For example, the fast logging speed may be implemented at as much as 60 feet per minute. Once one or more sand flows have been detected at certain depths, regions at those depths can be re-logged at a slower logging speed, or in stationary mode, to localize the sand flow(s) at a finer spatial resolution. In embodiments where an acoustic signal is emitted along an extended path (as opposed to from a point source), the whole flow path may be mapped out in a two-dimensional space of depth and radial distance.

Figure 8:
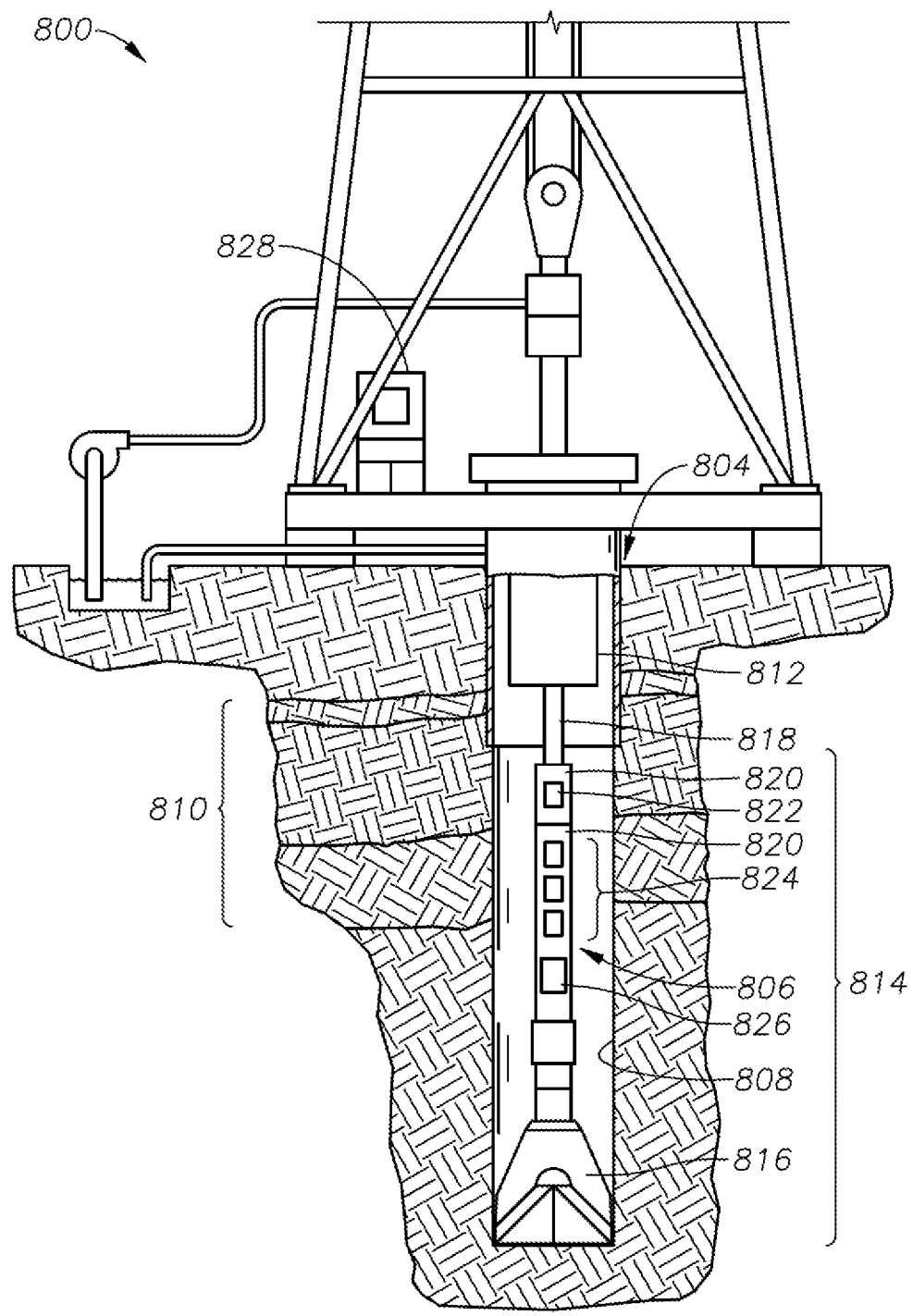
FIG. 8 is a schematic diagram of a system for detecting and classifying sand-generated underground acoustic sources deployed along a drilling system for MWD logging operations, according to certain illustrative methods of the present disclosure.

FIG. 8 is a schematic diagram of a system for detecting and classifying sand-generated underground acoustic sources deployed along a drilling system for MWD logging operations, according to certain illustrative methods of the present disclosure. This may be useful, for example, to detect sand flows for the purpose of steering or otherwise adjusting drilling based thereon. As shown, the drilling system includes a drilling rig 800 located at the surface of a well 804 and, supported by drilling rig 800, a drill string 806 for drilling a wellbore 808 through subsurface formations 810. Drill string 806 includes drill pipe 812 and, generally located at the lower end of drill pipe 812, a bottom hole assembly ("BHA") 814.

BHA 814 may include drill bit 816 and, disposed thereabove, one or more drill collars 818, 820, which may contain a number of different tools and instruments adapted for taking measurements during the drilling process. In accordance with various embodiments, these tool may include an acoustic sensor array 824, for example, including three or more linearly arranged sensors, and associated control and processing circuitry 826 (e.g., sand detection and classification system 100). Acoustic sensor array 824 may be in communication with surface data-processing system 828. Collectively, the acoustic sensor array 824 and the control and processing circuitry 826 and/or data-processing system 828 provide functionality for implementing the sand-detection and classification methods described herein.

Accordingly, the illustrative sand detection/classification systems and methods described herein provide a number of advantages. First, the model-based frameworks provide sand detection/classification without the need to use costly and intrusive surface measurements of production fluids (although surface measurements may be used in certain embodiments). Second, through the combination of theoretical and empirical data, the model frameworks allow the system to expand its understanding about the properties of sand and improve the classification and detection over time, as the training data set expands far beyond a theoretical understanding.

Embodiments and methods of the present disclosure described herein further relate to any one or more of the following paragraphs:

1. A computer-implemented method to detect sand in a wellbore, the method comprising acquiring one or more acoustic signals using a passive acoustic array tool positioned along a wellbore, the acoustic signals being generated by sand movement in the wellbore adjacent the tool; extracting a feature from the acoustic signals; and performing one or both of: detecting a presence of sand in the wellbore using the extracted feature; and classifying the sand using the extracted feature.

2. A computer-implemented method as defined in paragraph 1, wherein classifying the sand comprises determining one or more of a sand density, flow rate, and particle size.

3. A computer-implemented method as defined in paragraph 1 or 2, wherein extracting the feature comprises determining a maximum eigenvalue of the acoustic signals; or determining a ratio of eigenvalues of the acoustic signals.

4. A computer-implemented method as defined in any of paragraphs 1-3, wherein classifying the sand comprises using the maximum eigenvalue to determine a flow rate of the sand; or using the ratio of eigenvalues to determine the flow rate of the sand.

5. A computer-implemented method as defined in any of paragraphs 1-4, wherein extracting the feature comprises determining one or more of a spectral power density, time-frequency component, covariance matrix, or phase and magnitude patterns of the acoustic signals.

6. A computer-implemented method as defined in any of paragraphs 1-5, wherein a machine learning technique is applied to determine which features to extract from the acoustic signals.

7. A computer-implemented method as defined in any of paragraphs 1-6, wherein the machine learning technique utilizes verified training data from the wellbore or other wellbores to determine which features to extract from the acoustic signals.

8. A computer-implemented method as defined in any of paragraphs 1-7, further comprising performing a wellbore intervention operation based upon the presence of sand or sand classification.

9. A system to detect sand in a wellbore, the system comprising a passive acoustic array tool to receive a plurality of acoustic signals using sensors positioned thereon, wherein the passive acoustic array tool is adapted to be positioned along a wellbore and the acoustic signals are generated by sand movement in the wellbore adjacent the passive acoustic array tool; and processing circuitry communicably coupled to the passive acoustic array tool to implement a method comprising acquiring one or more acoustic signals using the passive acoustic array tool; extracting a feature from the acoustic signals; and performing one or both of: detecting a presence of sand in the wellbore using the extracted feature; and classifying the sand using the extracted feature.

10. A system as defined in paragraph 9, wherein classifying the sand comprises determining one or more of a sand density, flow rate, and particle size.

11. A system as defined in paragraphs 9 or 10, wherein extracting the feature comprises determining a maximum eigenvalue or eigenvalue ratio of the acoustic signals.

12. A system as defined in any of paragraphs 9-11, wherein classifying the sand comprises using the maximum eigenvalue or eigenvalue ratio to determine a flow rate of the sand.

13. A system as defined in any of paragraphs 9-12, wherein extracting the feature comprises determining one or more of a spectral power density, time-frequency component, covariance matrix, or phase and magnitude patterns of the acoustic signals.

14. A system as defined in any of paragraphs 9-13, wherein a machine learning technique is applied to determine which features to extract from the acoustic signals.

15. A system as defined in any of paragraphs 9-14, wherein the machine learning technique utilizes verified training data from the wellbore or other wellbores to determine which features to extract from the acoustic signals.

16. A system as defined in any of paragraphs 9-15, wherein the passive acoustic array tool forms part of a logging or wireline assembly.

17. A method to detect sand in a wellbore, the method comprising acquiring acoustic signals using a passive acoustic array tool positioned along a wellbore, the acoustic signals being generated by sand movement adjacent the tool; extracting a feature from the acoustic signals; and using the extracted feature to detect sand in the wellbore.

18. A method as defined in paragraph 17, wherein detecting the sand further comprises classifying the sand.

19. A method as defined in paragraphs 17 or 18, wherein an eigenvalue is used to detect the sand.

20. A method as defined in paragraphs 17-19, wherein a machine learning technique is used to detect the sand.

Furthermore, the illustrative methods described herein may be implemented by a system comprising processing circuitry or a non-transitory computer readable medium comprising instructions which, when executed by at least one processor, causes the processor to perform any of the methods described herein.

Although various embodiments and methods have been shown and described, the present disclosure is not limited to such embodiments and methods and will be understood to include all modifications and variations as would be apparent to one skilled in the art. Therefore, it should be understood that this disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method to detect sand in a wellbore, the method comprising:
    acquiring one or more acoustic signals using one or more sensors of a passive acoustic array tool positioned along a wellbore, the acoustic signals being generated by sand movement in the wellbore adjacent the tool;
    extracting a feature from the acoustic signals using a machine learning technique, wherein the feature extraction comprises:
        extracting features from the acoustic signals where classification parameters of the features are known or learned;
        analyzing a relationship between the features and the classification parameters; and
        selecting those features which most accurately estimate the classification parameters, wherein the selected features are extracted; and
    performing one or both of:
        detecting a presence of sand in the wellbore using the extracted feature; and
        classifying the sand using the extracted feature,
    wherein extracting the feature comprises:
        determining a maximum eigenvalue of the acoustic signals; or
        determining a ratio of eigenvalues of the acoustic signals.

2. A computer-implemented method as defined in claim 1, wherein classifying the sand comprises determining one or more of a sand density, flow rate, and particle size.

3. A computer-implemented method as defined in claim 1, wherein classifying the sand comprises:
    using the maximum eigenvalue to determine a flow rate of the sand; or
    using the ratio of eigenvalues to determine the flow rate of the sand.

4. A computer-implemented method as defined in claim 1, wherein extracting the feature comprises determining one or more of a spectral power density, time-frequency component, covariance matrix, or phase and magnitude patterns of the acoustic signals.

5. A computer-implemented method as defined in claim 1, wherein the machine learning technique utilizes verified training data from the wellbore or other wellbores to determine which features to extract from the acoustic signals.

6. A computer-implemented method as defined in claim 1, further comprising performing a wellbore intervention operation based upon the presence of sand or sand classification.

7. A computer-implemented method as defined in claim 1, wherein the machine learning technique selects which portion of the maximum eigenvalue spectrum is best suited to detect the presence of sand.

8. A computer-implemented method as defined in claim 7, wherein the maximum eigenvalue spectrum is adjusted using training data.

9. A system to detect sand in a wellbore, the system comprising:
   a passive acoustic array tool to receive a plurality of acoustic signals using sensors positioned thereon, wherein the passive acoustic array tool is adapted to be positioned along a wellbore and the acoustic signals are generated by sand movement in the wellbore adjacent the passive acoustic array tool; and
   processing circuitry communicably coupled to the passive acoustic array tool to implement a method comprising:
      acquiring one or more acoustic signals using one or more sensors of the passive acoustic array tool;
      extracting a feature from the acoustic signals using a machine learning technique, wherein the feature extraction comprises:
         extracting features from the acoustic signals where classification parameters of the features are known or learned;
         analyzing a relationship between the features and the classification parameters; and
         selecting those features which most accurately estimate the classification parameters, wherein the selected features are extracted; and
      performing one or both of:
         detecting a presence of sand in the wellbore using the extracted feature; and
         classifying the sand using the extracted feature,
      wherein extracting the feature comprises:
         determining a maximum eigenvalue of the acoustic signals; or
         determining a ratio of eigenvalues of the acoustic signals.

10. A system as defined in claim 9, wherein classifying the sand comprises determining one or more of a sand density, flow rate, and particle size.

11. A system as defined in claim 9, wherein classifying the sand comprises using the maximum eigenvalue or eigenvalue ratio to determine a flow rate of the sand.

12. A system as defined in claim 9, wherein extracting the feature comprises determining one or more of a spectral power density, time-frequency component, covariance matrix, or phase and magnitude patterns of the acoustic signals.

13. A system as defined in claim 9, wherein the machine learning technique utilizes verified training data from the wellbore or other wellbores to determine which features to extract from the acoustic signals.

14. A system as defined in claim 9, wherein the passive acoustic array tool forms part of a logging or wireline assembly.

15. A method to detect sand in a wellbore, the method comprising:
   acquiring acoustic signals using one or more sensors of a passive acoustic array tool positioned along a wellbore, the acoustic signals being generated by sand movement adjacent the tool;
   extracting a feature from the acoustic signals by:
      extracting features from the acoustic signals where classification parameters of the features are known or learned;
      analyzing a relationship between the features and the classification parameters; and
      selecting those features which most accurately estimate the classification parameters, wherein the selected features are extracted by:
         determining a maximum eigenvalue of the acoustic signals; or
         determining a ratio of eigenvalues of the acoustic signals; and
   using the extracted feature to detect sand in the wellbore, wherein an eigenvalue is used to detect the sand.

16. A method as defined in claim 15, wherein detecting the sand further comprises classifying the sand.

* * * * *